United States Patent [19]
Borza

[11] Patent Number: 6,084,977
[45] Date of Patent: Jul. 4, 2000

[54] METHOD OF PROTECTING A COMPUTER SYSTEM FROM RECORD-PLAYBACK BREACHES OF SECURITY

[75] Inventor: Stephen J. Borza, Ottawa, Canada

[73] Assignee: DEW Engineering and Development Limited, Ottawa, Canada

[21] Appl. No.: 08/943,093

[22] Filed: Sep. 26, 1997

[51] Int. Cl.[7] .................................................. G06K 9/00
[52] U.S. Cl. ......................... 382/124; 382/115; 382/128
[58] Field of Search .................................. 382/100, 115, 382/116, 124, 125, 190; 380/23, 25; 902/1, 4, 5

[56] References Cited

U.S. PATENT DOCUMENTS

| | | | |
|---|---|---|---|
| 4,998,279 | 3/1991 | Weiss | 380/23 |
| 5,161,204 | 11/1992 | Hutcheson et al. | 382/190 |
| 5,280,527 | 1/1994 | Gullman et al. | 380/23 |
| 5,386,104 | 1/1995 | Sime | 235/379 |
| 5,426,708 | 6/1995 | Hamada et al. | 382/115 |
| 5,466,918 | 11/1995 | Ray et al. | 382/115 |

*Primary Examiner*—Jose L. Couso
*Assistant Examiner*—Duy M. Dang
*Attorney, Agent, or Firm*—Neil Teitelbaum & Associates

[57] ABSTRACT

A record-playback attack on a security system involves recording authorisation information such as passwords and playing them back to the server at a later time to unlawfully access a system. A method is disclosed for detecting record-playback of biometric information. When biometric information is provided to a server, it is always slightly different due to the nature of human input, health, etc. When two biometric input samples are substantially identical, a record-playback attack on system security is suspected and access is denied.

14 Claims, 6 Drawing Sheets

METHOD OF PROTECTING A COMPUTER SYSTEM FROM RECORD-PLAYBACK BREACHES OF SECURITY

FIELD OF THE INVENTION

This invention relates generally to biometric identification systems and more particularly relates to a method of reducing the effectiveness of record-playback attacks on system security.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require knowledge of an entry code that has been selected by a user or has been configured in advance.

Pre-set codes are often forgotten as users have no reliable method of remembering them. Writing down the codes and storing them in close proximity to an access control device (i.e. a combination lock) results in a secure access control system with a very insecure code. Alternatively, the nuisance of trying several code variations renders the access control system more of a problem than a solution.

Password systems are known to suffer from other disadvantages. Usually, passwords are specified by a user. Most users, being unsophisticated users of security systems, choose passwords which are relatively insecure. As such, many password systems are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam. In order to capture an image of a fingerprint, a system is prompted through user entry that a fingertip is in place for image capture. This is impractical as it likely requires the use of two hands. Another method of identifying fingerprints is to capture images continuously and to analyse each image to determine the presence of biometric information such as a fingerprint. This method requires significant processing image transfer times and is therefore, not suited to many applications.

The use of a biometric imaging device with a personal computer is considered inevitable. Unfortunately, a device specifically designed to gain access to a system secured through biometric information is plausible. Such a device connects to a personal computer in a same fashion as a contact imaging device but does not require provision of biometric information. Some forms of infiltrating biometric systems include a record-playback attack wherein biometric information is intercepted, recorded, and then played back at a later time; repeat pattern sending, wherein patterns are sent to the biometric identification system until an authorisation occurs; etc. It would be advantageous to detect and disable access during record-playback attacks on system security.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterisation is well known and can involve many aspects of fingerprint analysis. The analysis of fingerprints is discussed in the following references which are hereby incorporated by reference:

Xiao Qinghan and Bian Zhaoqi,: An approach to Fingerprint Identification By Using the Attributes of Feature Lines of Fingerprint, IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73–18, Purdue University, School of Electrical Engineering, 1973;

Wegstein, *An Automated Fingerprint Identification System*, NBS special publication, U.S. Department of Commerce/National Bureau of Standards, ISSN 0083–1883; no. 500-89, 1982;

Moenssens, Andre A., *Fingerprint Techniques*, Chilton Book Co., 1971; and, Wegstein and J. F. Rafferty, *The LX39 Latent Fingerprint Matcher*, NBS special publication, U.S. Department of Commerce/National Bureau of Standards; no. 500-36, 1978.

OBJECT OF THE INVENTION

It is an object of this invention to provide a method of reducing the efficacy of a record-playback attack.

STATEMENT OF THE INVENTION

In accordance with a broad embodiment of the invention, user authorisation information is analysed to extract therefrom information that varies with each access attempt. The information that varies is compared to similar information from previous access attempts to detect identical authorisation information and thereby detect record-playback.

In accordance with the invention a method is provided for detecting pre-recorded biometric information. The method comprises the steps of: receiving biometric information provided to a biometric information input device; providing first digital data in dependence upon the received biometric information; comparing the first digital data to stored digital data stored in memory means, the stored digital data based on previously provided digital data; and, when the first digital data and the stored digital data are substantially similar, providing an indication of pre-recorded biometric information.

In accordance with the invention a method is provided for detecting record-playback. The method comprises the steps of: a) receiving authorisation data during an access attempt, the authorisation data comprising some data that is substantially unique to each access attempt by a same user; b) determining the data that is substantially unique to each access attempt by a same user and providing detection data in dependence thereon; c) comparing the detection data to stored detection data from previous authorisation data samples provided during previous successful access attempts; d) when the detection data are similar within predetermined limits, detecting record-playback.

In accordance with the invention a method is provided for detecting record-playback. The method comprises the steps of:

receiving biometric information provided to a biometric information input device; digitising at least some of the biometric information and providing current digital data in dependence upon the digitised biometric information;

registering the digitised biometric information and a stored template to identify an individual from whom the biometric information is provided; and if an identity is determined performing the following steps:

comparing the current digital data to stored digital data stored in memory means, the stored digital data a result of previously received biometric information, and, detecting record-playback, when the current digital data and the stored digital data are substantially similar.

It is an advantage of the present invention that a type of record-playback attack is detected.

BRIEF DESCRIPTION OF THE DRAWINGS

An exemplary embodiment of the invention will now be described in conjunction with the attached drawings, in which.

DETAILED DESCRIPTION

The invention is described with respect to fingerprint registration. The method of this invention is applicable to other biometric information and to other forms of user authorisation as is evident to those of skill in the art.

Figure 1:
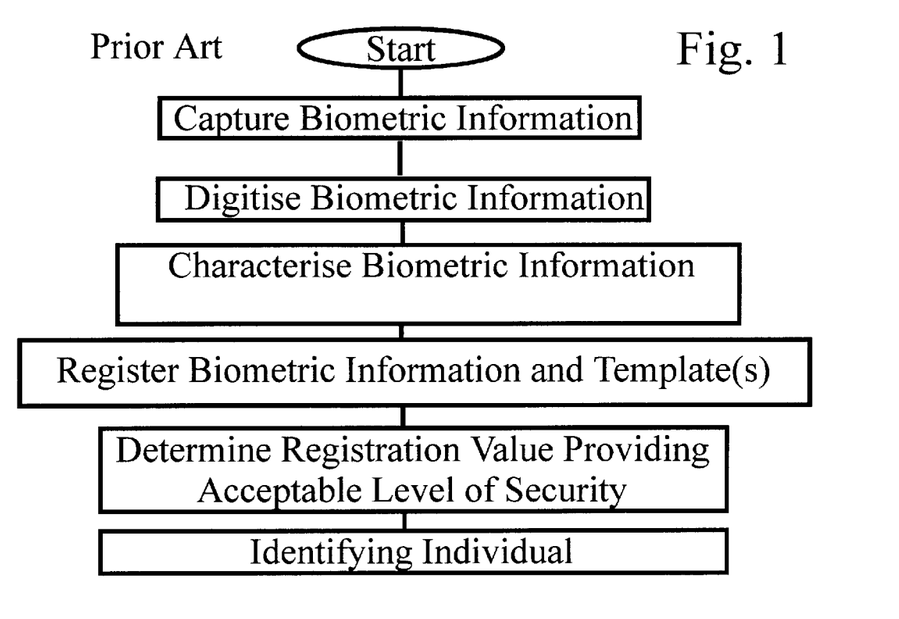
FIG. 1 is a simplified flow diagram of a method of identifying an individual based on captured biometric information according to the prior art.

Referring to FIG. 1, a prior art method of user authorisation is shown relying on biometric information provided by an individual for user authentication. Biometric information in the form of a fingerprint from a biometric information source of an individual in the form of a fingertip is captured using a biometric information input device in the form of a contact imager. Contact imagers, as described above, are known in the art of electronic security. The fingerprint is digitised and the digitised fingerprint is characterised. Characterisation of fingerprints is known in the art of fingerprint analysis and, in general involves extracting features in a substantially global reference frame for comparison against template features.

The characterised digitised biometric information is registered with stored templates to locate a template that within a predetermined level of security in the form of a predetermined false acceptance rate matches the characterised information. When a match is detected, the individual is identified and a corresponding action is performed. Some corresponding actions are system access, unlocking a door, logging access, providing personal information, billing the individual, etc.

Unfortunately, someone recording a session wherein access is granted has a recording of biometric information that results in a successful access to the system. Recording and playing back the biometric information is termed "record-playback" and is a common form of breaching security.

Figure 2:
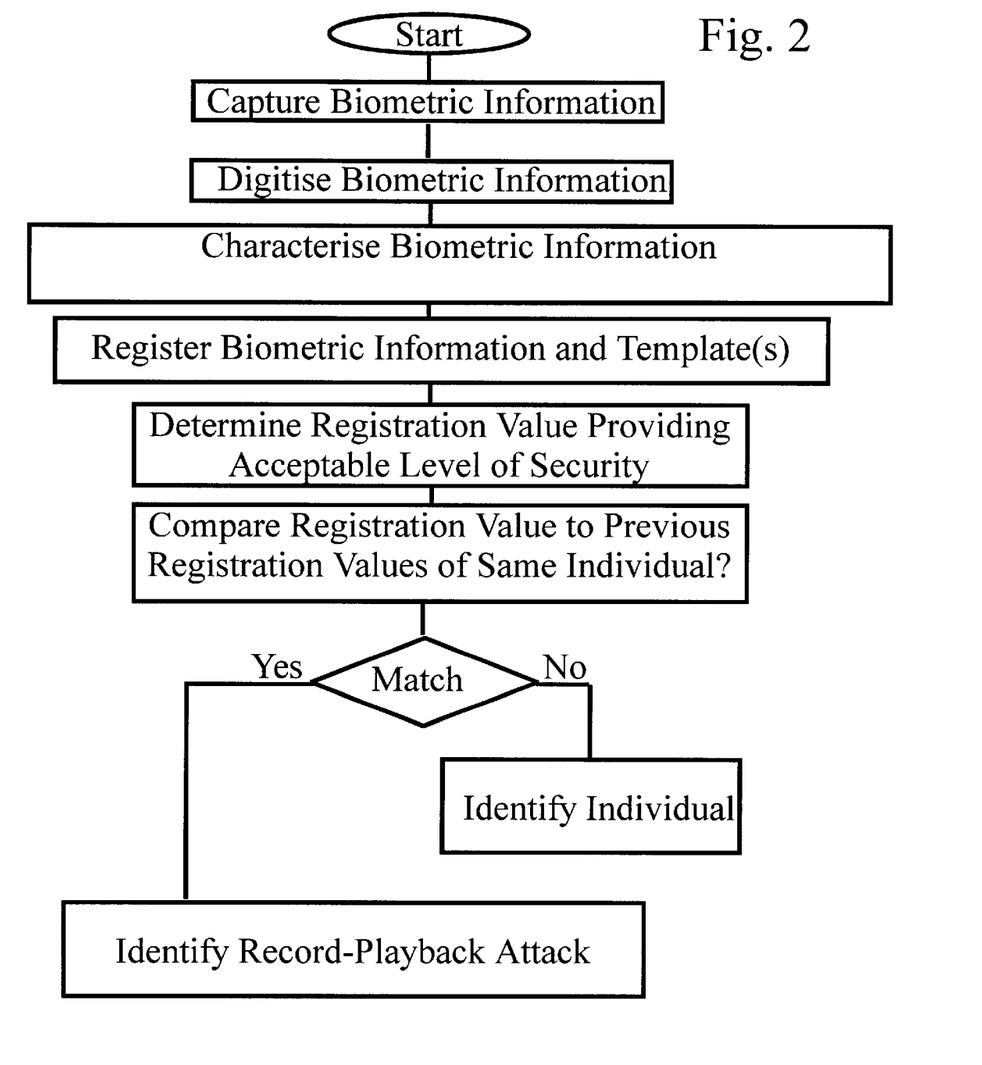
FIG. 2 is a simplified flow diagram of a method of identifying an individual based on captured biometric information with play-back detection according to the invention.

Referring to FIG. 2, a simplified flow diagram of a method according to the invention of detecting record-playback is shown. Biometric information in the form of a fingerprint from a biometric information source of an individual in the form of a fingertip is captured using a biometric information input device in the form of a contact imager. Contact imagers, as described above, are known in the art of electronic security. The fingerprint is digitised and the digitised fingerprint is characterised. Characterisation of fingerprints is known in the art of fingerprint analysis and, in general involves extracting features in a substantially global reference frame for comparison against template features.

The characterised digitised biometric information is registered with stored templates to locate a template that within a predetermined level of security in the form of a predetermined false acceptance rate matches the characterised information. When a match is detected, stored registration values associated with the individual are compared with the registration value. Exact matches or substantially similar matches are indicative that the biometric information captured is a substantially exact match with previously captured information; an unlikely occurrence. As such, when the registration result is substantially similar or exactly the same as a previous registration value, record-playback is suspected and the individual is prompted for another instance of biometric information.

When the registration value is substantially unique, the individual is identified and corresponding action is performed. Some corresponding actions are system access, unlocking a door, logging access, providing personal information, billing the individual, etc.

Comparing the registration values for similarity is dependent upon the registration process. When characterisation of the biometric information is a secure process based on a small number of features, an exact registration is very unlikely as is the possibility of modifying the biometric information recorded prior to playback in order to alter the registration value. In this instance, substantial similarity is required. Alternatively, when registration is dependent upon a lot of features of the biometric information or upon features which can easily be modified in the recorded biometric information, similarity is determined within predetermined limits which allow for such modifications.

Preferably, the biometric information input device is a low resolution contact imager. When very high resolution imaging is used, little error due to rotation and translation occurs within the registration value. It has been found that the use of a low resolution contact imager providing, for example, 200×240 pixel resolution results in significant errors in registration values in dependence upon rotation and translation of input information without compromising a level of security provided. Of course, when a high resolution imaging means is employed, a method similar to that described with reference to FIG. 4 is preferred.

Figure 3:
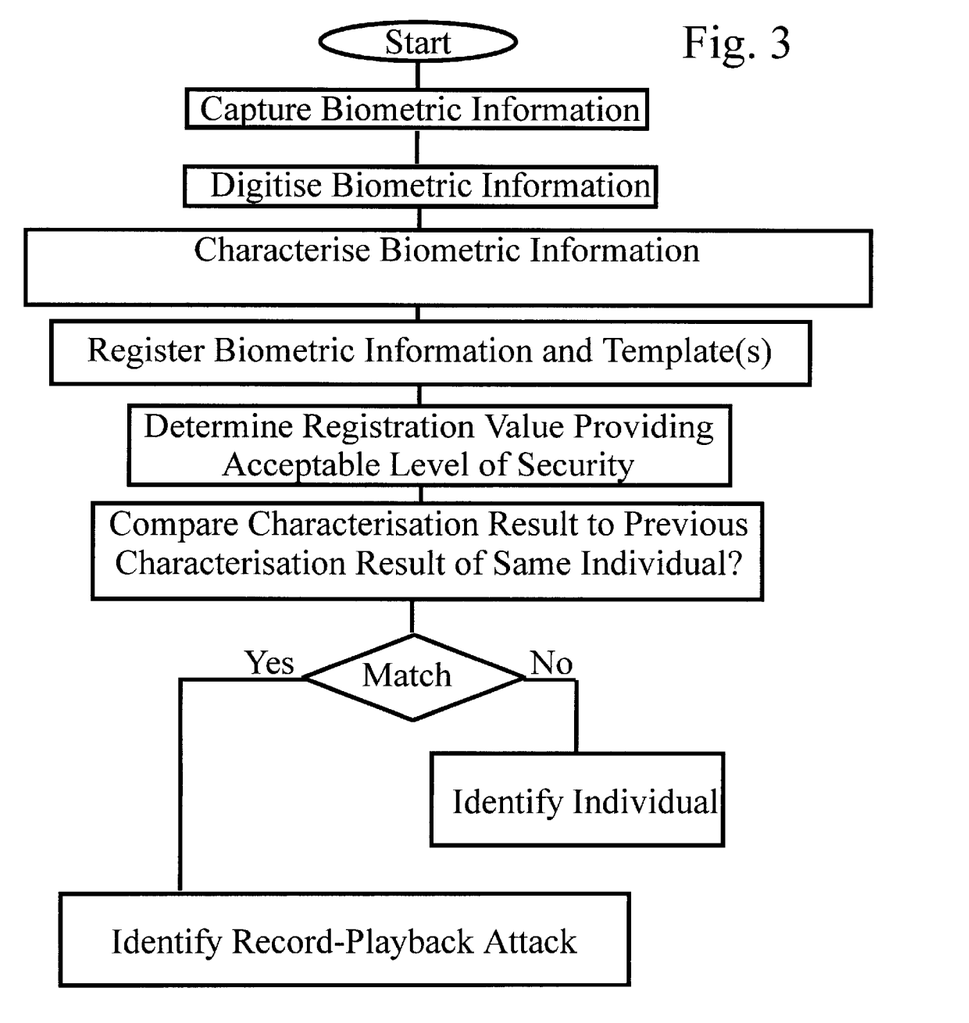
FIG. 3 is a simplified flow diagram of a method of identifying an individual based on captured biometric information with play-back detection according to the invention.

Referring to FIG. 3, a simplified flow diagram of a method according to the invention of detecting record-playback is shown. Authorisation data in the form of biometric information in the form of a fingerprint from a biometric information source of an individual in the form of a fingertip is captured using a biometric information input device in the form of a contact imager.

The biometric information is digitised and characterised. The characterised digitised biometric information is registered with stored data in the form of templates to locate a template that within a predetermined level of security in the form of a predetermined false acceptance rate matches the characterised information. When a match is detected, stored characterisations associated with the individual are compared with the current characterisation. Exact matches or substantially similar matches are indicative that the biometric information captured is an exact match with previously captured information; an unlikely occurrence. As such, when the characterisation is substantially similar or exactly the same as a previous characterisation, record-playback is suspected and the individual is prompted for another instance of biometric information. When the characterisation is substantially unique, the individual is identified and corresponding action is performed. Some corresponding actions are system access, unlocking a door, logging access, providing personal information, billing the individual, etc.

Figure 4:
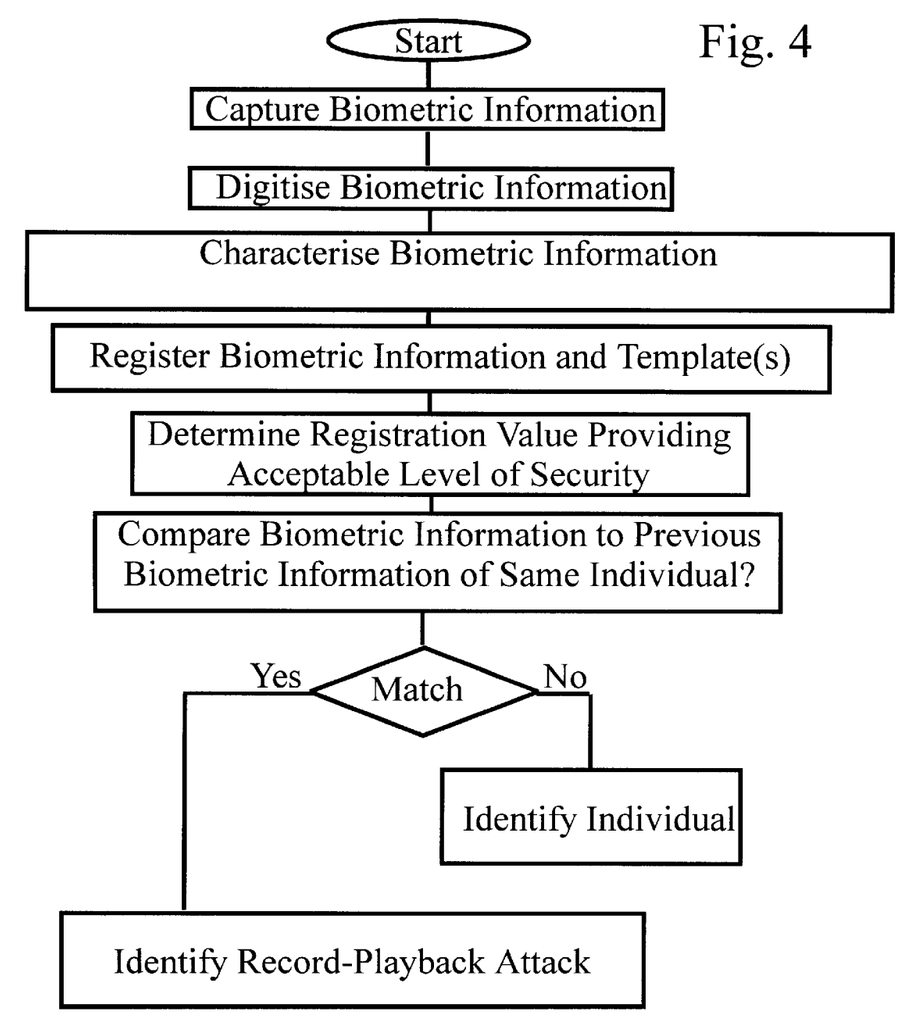
FIG. 4 is a simplified flow diagram of a method of identifying an individual based on captured biometric information with play-back detection according to the invention.

Referring to FIG. 4, a simplified flow diagram of a method according to the invention of detecting record-playback is shown. Biometric information in the form of a fingerprint from a biometric information source of an individual in the form of a fingertip is captured using a biometric information input device in the form of a contact imager.

The biometric information is characterised. The characterised digitised biometric information is registered with stored templates to locate a template that within a predetermined level of security in the form of a predetermined false acceptance rate matches the characterised information. When a match is detected, stored biometric information samples associated with the individual are compared with the current biometric information samples. Exact matches or substantially similar matches are indicative that the biometric information captured is an exact match with previously captured information; a very unlikely occurrence. As such, when the biometric information sample is substantially similar or exactly the same as a previous biometric information sample, record-playback is suspected and the individual is prompted for another instance of biometric information. When the biometric information sample is substantially unique, the individual is identified and corresponding action is performed. Some corresponding actions are system access, unlocking a door, logging access, providing personal information, billing the individual, etc.

Figure 5:
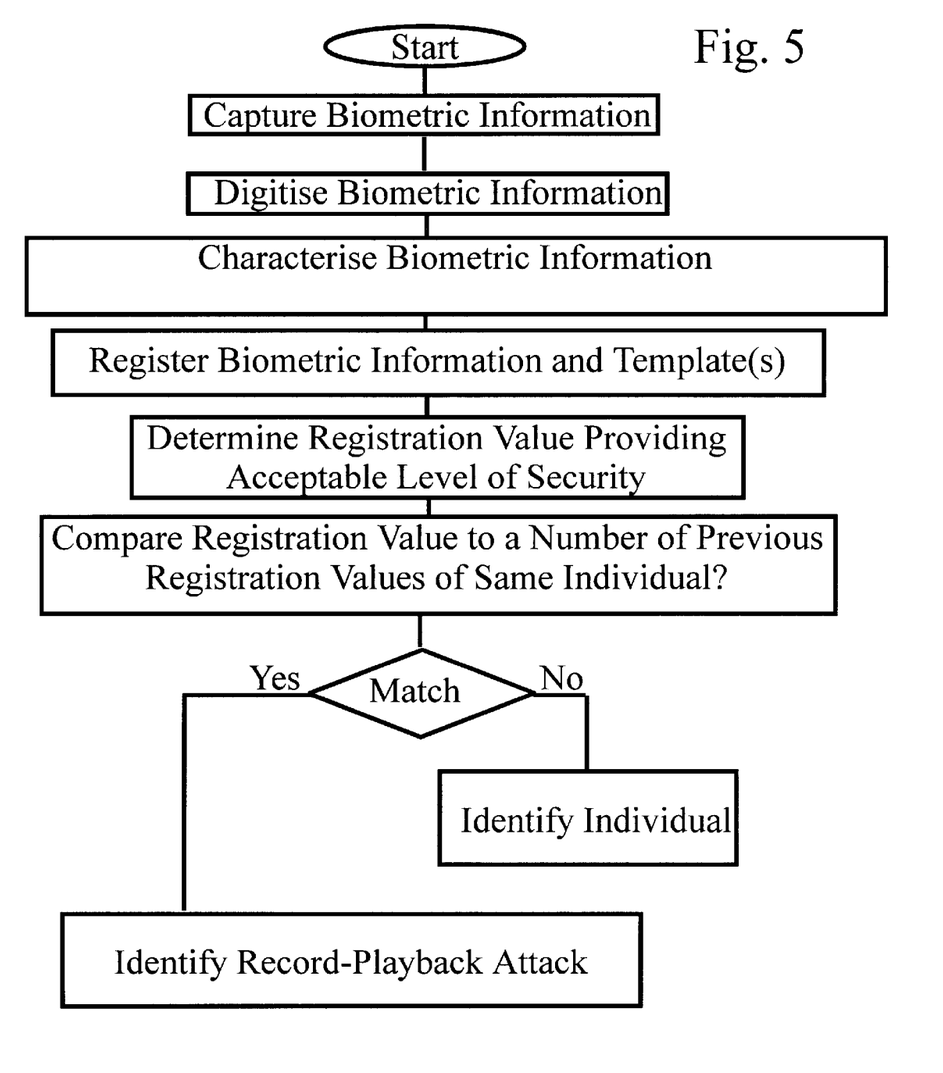
FIG. 5 is a simplified flow diagram of a method of identifying an individual based on captured biometric information with play-back detection according to the invention; and, FIG. 6 is a simplified flow diagram of a yet another method of identifying an individual based on captured biometric information with play-back detection according to the invention.

Referring to FIG. 5, a simplified flow diagram of a method according to the invention of detecting record-playback is shown. Biometric information in the form of a fingerprint from a biometric information source of an individual in the form of a fingertip is captured using a biometric information input device in the form of a contact imager.

The biometric information is characterised. The characterised digitised biometric information is registered with stored templates to locate a template that within a predetermined level of security in the form of a predetermined false acceptance rate matches the characterised information. When a match is detected, a predetermined number of stored registration values associated with the individual are compared with the current registration value. For example, the last 10 unique registration values are stored. Exact matches or substantially similar matches are indicative that the biometric information captured is an exact match with previously captured information; a very unlikely occurrence. Of course a similar method is applicable to the flow diagrams of FIGS. 3 and 4 as well. For example, for the method described with reference to FIG. 4, storing all previous captured biometric information for every user is taxing on system resources. Even with compression ratios of 70%, a biometric information sample at 200×240 pixels with 8 bit depth will occupy over 13,000 bytes. When user authorisation is performed several times a day for each of thousands of users, this results in many MB of information daily. In contrast, when the registration value is a 10 byte value, this results in less than 0.1MB daily. The difference is very significant.

Of course, storing entire biometric information samples allows for a better analysis to determine record-playback. For example, when a significant portion of the biometric information sample is identical, record-playback is detected. This prevents simple operations such as image shifting or replacing some pixels within the image from resulting in missed instances of record-playback.

Figure 6:
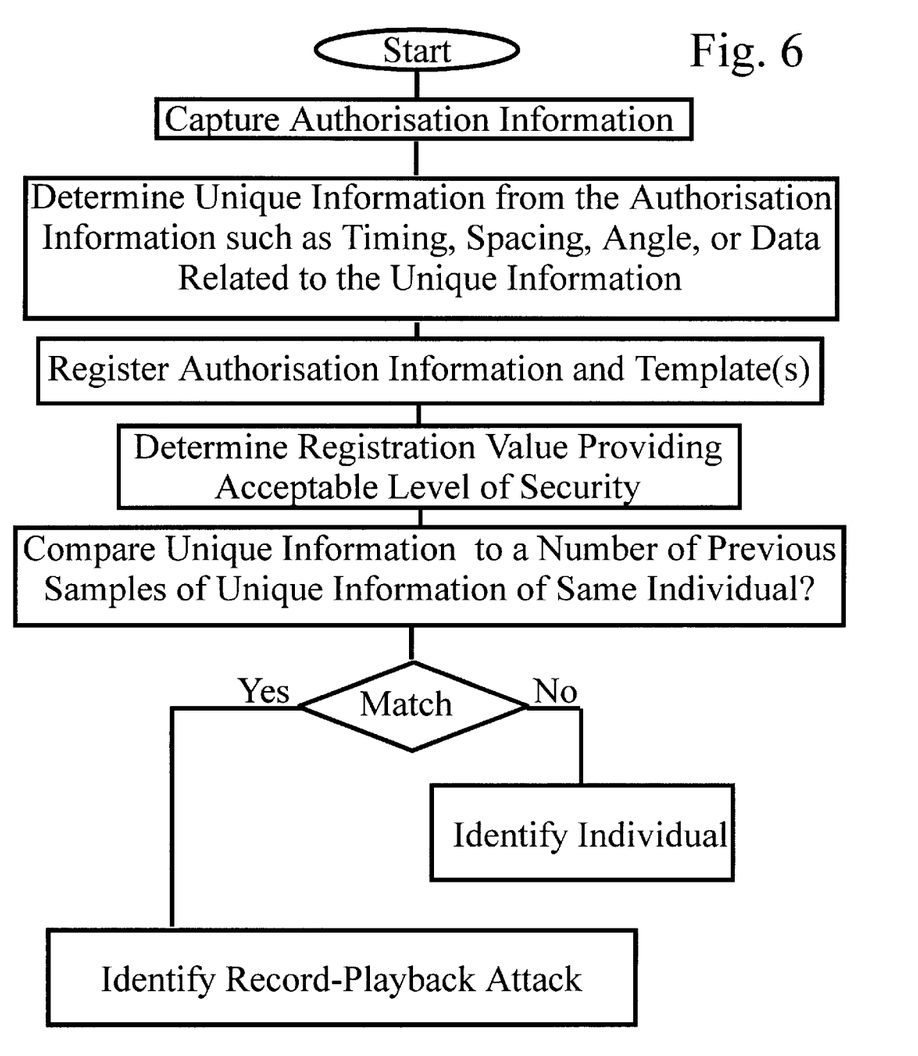

Referring to FIG. 6, a simplified diagram of a further method according to the invention is shown. Authorisation data in the form of a password is captured. The use of passwords for user authorisation is well known. Along with the text data that commonly forms a password, other detection data is captured. This detection data is in the form of unique identifiers relating to the presentation of the information. Examples of these identifiers are timing between key presses, force exerted on the keys, etc. It is evident that these factors are not currently captured with passwords but that technology exists for capturing identifiers such as these.

When a password is recorded and played back, the timing, for example, in the play-back remains consistent. A first play-back may succeed, but subsequent play-backs will be detected. Alternatively, the system detects play-back attacks on security by analysing the unique identifier. Using timing between key strokes as an example, between each keystroke a different time occurs. This is very likely if not necessary from human entry of passwords. During record playback, same spacing between characters is often employed. This results in an easily detected instance of a play-back attack. Similarly, when a user timing is analysed, it is often consistent. For example, the 'a' key is pressed more rapidly than the s key or some such result. When a password is entered with timing that does not meet the known characteristics of the individual who is authorised to access the system, play-back is suspected and a further password is requested. The further password may be a same password to verify timing again or may be a different back-up password for additional security.

Alternatively, in accordance with the invention, during fingerprint sensing, a plurality of successive frames or data groups are compared to determine a correlation therebetween to see if play-back is underway. Often, an individual fingerprint moves on the platen and changes contrast over time. Of course a play-back fingerprint remains substantially constant.

Numerous other embodiments may be envisaged without departing from the spirit and scope of the invention.

What is claimed is:

1. A method of detecting pre-recorded biometric information comprising the steps of:

receiving biometric information provided to a biometric information input device from a biometric information source;

providing first digital data derived from the received biometric information;

comparing the first digital data to stored digital data stored in memory means, the stored digital data derived from previously provided biometric information; and, when (i) the first digital data and the stored digital data are similar such that a likelihood that the first digital data and the stored digital data are provided in dependence upon two instances of same biometric information is above a predetermined registration likelihood and (ii) such that a likelihood that the first digital data and the stored digital data are provided in dependence upon two different instances of received biometric information provided from the biometric information source at a different time one from the other is below a predetermined likelihood, providing an indication of pre-recorded biometric information.

2. A method of detecting pre-recorded biometric information as defined in claim 1 wherein the step of providing first digital data comprises analysing the received biometric information for registration information and providing the first digital data in dependence upon the registration data.

3. A method of detecting pre-recorded biometric information as defined in claim 1 comprising the step of regestering data derived from the biometric information and a template to determine an identity of an individual providing the biometric information, wherein the step of comparing the first digital data comprises comparing the digital data to previous digital data provided by a same individual.

4. A method of detecting pre-recorded biometric information as defined in claim 1 wherein the first digital data comprise a registration result indicative of user identity and the previous digital data comprise previous registration results for a same individual.

5. A method of detecting pre-recorded biometric information as defined in claim 1 wherein the first digital data comprise a characterisation of the received biometric information and each previous digital data comprise a characterisation of previously received biometric information provided by a same individual.

6. A method of detecting pre-recorded biometric information as defined in claim 1 wherein the step of providing an indication comprises the steps of:

prompting an individual to provide further biometric information; receiving further biometric information provided to the biometric information input device;

deriving further digital data from the further biometric information;

comparing the further digital data to the stored digital data stored in memory means; and, when a substantial portion of the further digital data and a substantial portion of the stored digital data are identical, providing a further indication of pre-recorded biometric information.

7. A method of detecting pre-recorded biometric information as defined in claim 1 comprising the steps of:

characterising the biometric information;

registering the characterised biometric information with stored templates to provide registration values;

if a registration value is indicative of an identity of an individual from whom the biometric information is received, identifying the individual.

8. A method of detecting pre-recorded biometric information as defined in claim 7 comprising the step of:

associating the first digital data with an identified individual and storing the associated first digital data for use as stored digital data.

9. A method of detecting pre-recorded biometric information as defined in claim 1 wherein the step of providing an indication is performed when the first digital data and the stored digital data are identical.

10. A method of detecting pre-recorded biometric information comprising the steps of:

receiving biometric information provided to a biometric information input device;

digitising at least some of the biometric information and providing first digital data derived from the digitised biometric information;

registering the first digital data and a stored template to identify an individual from whom the biometric information is received; and if an identity is determined by the step of registering the first digital data and the stored template performing the following steps:

comparing the digitised biometric information to stored digital data stored in memory means, the stored digital data corresponding to previously received biometric information, and, when the digitised biometric information and the stored digital data are approximately identical, providing an indication of pre-recorded biometric information.

11. A method of detecting pre-recorded biometric information as defined in claim 10 wherein the first digital data comprise a registration result indicative of user identity and the previous digital data comprise previous registration results for a same individual.

12. A method of detecting pre-recorded biometric information as defined in claim 10 comprising the step of:

characterising the digitised biometric information wherein the first digital data comprise a characterisation of the received biometric information and the previous digital data comprise characterisations of previous biometric information provided by a same individual.

13. A method of detecting pre-recorded biometric information as defined in claim 10 wherein the step of providing an indication comprises the steps of:

receiving further biometric information provided to the biometric information input device;

digitising at least some of the further biometric information and providing further digital data in dependence upon the digitised further biometric information;

comparing the further digital data to the stored digital data stored in memory means; and, when the further digital data and the stored digital data are substantially similar, providing the indication of pre-recorded biometric information.

14. A method of detecting provision of pre-recorded biometric information as defined in claim 10 comprising the step of:

associating the first digital data with an identified individual and storing the associated first digital data for use as stored digital data.

* * * * *